(12) United States Patent
Sacchetti et al.

(10) Patent No.: US 11,927,465 B2
(45) Date of Patent: Mar. 12, 2024

(54) FLOW SENSOR SYSTEM AND METHOD FOR USING SAME

(71) Applicant: Alcor Scientific, Inc., Smithfield, RI (US)

(72) Inventors: Peter J. Sacchetti, North Falmouth, MA (US); Hannu Pulli, Westboro, MA (US)

(73) Assignee: Alcor Scientific, Inc.

( * ) Notice: Subject to any disclaimer, the term of this patent is extended or adjusted under 35 U.S.C. 154(b) by 0 days.

(21) Appl. No.: 18/302,731

(22) Filed: Apr. 18, 2023

(65) Prior Publication Data

US 2023/0332937 A1 Oct. 19, 2023

Related U.S. Application Data

(60) Provisional application No. 63/332,595, filed on Apr. 19, 2022.

(51) Int. Cl.
*G01F 1/684* (2006.01)
(52) U.S. Cl.
CPC .......... *G01F 1/6847* (2013.01); *G01F 1/6842* (2013.01)
(58) Field of Classification Search
CPC ............................ G01F 1/6847; G01F 1/6842
See application file for complete search history.

(56) References Cited

U.S. PATENT DOCUMENTS

| 7,856,892 | B2 * | 12/2010 | Ohtake | G01F 1/7084 |
| | | | | 73/861.95 |
| 7,887,509 | B2 | 2/2011 | Thiebaud et al. | |
| 7,908,931 | B1 * | 3/2011 | Dam | G01F 1/7084 |
| | | | | 73/861.05 |
| 9,446,205 | B2 | 9/2016 | Norman et al. | |
| 9,814,845 | B1 | 11/2017 | Norman et al. | |
| 9,962,502 | B1 | 5/2018 | Norman et al. | |

(Continued)

FOREIGN PATENT DOCUMENTS

| CH | 704582 A1 * | 9/2012 | ........... G01F 1/6842 |
| WO | 2017085605 A1 | 5/2017 | |

(Continued)

OTHER PUBLICATIONS

"International Search Report and Written opinion received for PCT Patent Application No. PCT/US2023/065915, dated Oct. 20, 2023", 11 pages.

(Continued)

*Primary Examiner* — Herbert K Roberts
*Assistant Examiner* — Anthony W Megna Fuentes
(74) *Attorney, Agent, or Firm* — Adler Pollock & Sheehan P.C.

(57) ABSTRACT

A flow sensor system for detecting the presence or absence of flow of a liquid nutrient formula through a conduit of an enteral feeding system. The flow sensor system includes a channel configured to retain the conduit therein, a heat source disposed at a first location at a first portion of the conduit, and a heat detector disposed at a second location at a second portion of the conduit. The heat source may include an IR LED, and the heat detector may include a thermopile sensor. A method for using the flow sensor system to detect the presence or absence of flow of a liquid nutrient formula through a conduit of an enteral feeding system is also disclosed.

22 Claims, 16 Drawing Sheets

(56) References Cited

U.S. PATENT DOCUMENTS

| | | |
|---|---|---|
| 10,254,142 B2 | 4/2019 | Kostner et al. |
| 10,646,648 B2 | 5/2020 | Isaacson et al. |
| 10,722,660 B2 | 7/2020 | Van Oudenallen |
| 11,167,078 B2 | 11/2021 | Lutz et al. |
| 2011/0118705 A1 | 5/2011 | Dekker et al. |
| 2014/0155867 A1* | 6/2014 | Lee .............. G01F 15/001 |
| | | 73/204.22 |
| 2016/0235630 A1* | 8/2016 | Zuijderduin ........ A61J 15/0076 |
| 2017/0276524 A1* | 9/2017 | Otsuka .................... B41J 2/175 |
| 2018/0078195 A1 | 3/2018 | Sutaria et al. |
| 2019/0134305 A1 | 5/2019 | Srinivasan et al. |
| 2019/0240423 A1 | 8/2019 | O'Neill et al. |
| 2020/0205738 A1 | 7/2020 | Adawi et al. |
| 2020/0282140 A1 | 9/2020 | Isaacson et al. |
| 2021/0260306 A1 | 8/2021 | Gravenstein et al. |

FOREIGN PATENT DOCUMENTS

| | | |
|---|---|---|
| WO | 2018154407 A1 | 8/2018 |
| WO | 2021/044055 A1 | 3/2021 |
| WO | 2021191701 A1 | 9/2021 |

OTHER PUBLICATIONS

Stoaynov, et al., "Middle Infrared LEDs: Key Element for New Generation Chemical Sensors", Proc. of SPIE, vol. 8257, 2012, pp. 82571E-1-82571E-6.

* cited by examiner

FLOW SENSOR SYSTEM AND METHOD FOR USING SAME

RELATED APPLICATION

This application claims the benefit of priority to U.S. Provisional Patent Application No. 63/332,595, filed Apr. 19, 2022, the disclosure of which is incorporated by reference herein in its entirety.

FIELD OF THE INVENTION

The invention generally relates to a flow sensor system for use with enteral feeding systems and methods for using same.

BACKGROUND OF THE INVENTION

In general, enteral feeding pump systems are used to supply fluid nutrition to patients who are unable to eat through their mouths. The pumping mechanism typically includes a pump 10 and disposable tubing sets (see FIG. 4). An exemplary enteral feeding pump is shown in FIG. 4 and is used with a disposable fluid delivery set with two separate source containers connected by tubing to a tubing adapter that combines flow from the two separate tubes into a single fluid stream. An enteral feeding pump may be designated to pump only liquid nutrient formula or nutrient formula and water, separately. Occlusions in the tubing cause the problematic reduction or cessation of flow of the fluid nutrition to the patient.

There is therefore a need for a flow sensor system that facilitates improved flow in the tubing of an enteral feeding pump, including the reliable detection of flow reductions and occlusions in the conduit/tubing.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to an embodiment of the invention, a flow sensor system for detecting the presence or absence of flow through a conduit of an enteral feeding system includes a channel configured to retain the conduit therein; a heat source disposed at a first location at a first portion of the conduit; and a heat detector disposed at a second location at a second portion of the conduit.

In another embodiment, the heat source includes an IR LED.

In another embodiment, the heat detector includes a thermopile sensor.

According to another embodiment of the invention, a flow sensor system for detecting the presence or absence of flow through a conduit of an enteral feeding system includes a channel configured to retain the conduit therein; a heat source disposed at a first location at a first portion of the conduit, the heat source including an IR LED; a photodiode IR sensor at a location proximate the IR LED, wherein the photodiode IR sensor is configured to be illuminated by the IR LED, and whereby the photodiode IR sensor is used to detect the presence of the conduit in the channel; and a heat detector disposed at a second location at a second portion of the conduit, wherein the heat detector includes a thermopile sensor.

According to another embodiment of the invention, a method of detecting the presence or absence of flow of a liquid nutrient formula through a conduit of an enteral feeding system includes the steps of providing a flow sensor system for detecting the presence or absence of flow through the conduit, including a heat source disposed at a first location at a first portion of the conduit and a heat detector disposed at a second location at a second portion of the conduit; stopping flow of the liquid nutrient formula through the conduit; activating the heat source for a programmed time interval to heat at least a portion of the liquid nutrient formula in the conduit; restarting the flow of the liquid nutrient formula through the conduit; monitoring the relative temperature of the passing liquid nutrient formula using the heat detector at the second location, wherein the second location is downstream of the first location; and processing the relative temperature signal between the first and second locations to determine the presence of a partial or complete occlusion in the conduit.

According to another embodiment, a method of detecting the presence or absence of flow of a liquid nutrient formula through a conduit of an enteral feeding system includes the steps of providing a flow sensor system for detecting the presence or absence of flow through the conduit, including a heat source disposed at a first location at a first portion of the conduit and a heat detector disposed at a second location at a second portion of the conduit; activating the heat source; determining a reference temperature $T_1$ of the liquid nutrient formula at the second location; measuring a second temperature $T_2$ of the liquid nutrient formula at the second location; calculating the difference between the reference and second temperatures; and determining from the difference between the reference and second temperatures whether the flow of the liquid nutrient formula is low or completely absent, which would indicate a partial or complete occlusion, respectively, in the conduit.

These and other features and advantages will be apparent from a reading of the following detailed description and a review of the associated drawings. It is also to be understood that both the foregoing general description and the following detailed description are explanatory only and not restrictive of aspects as claimed.

BRIEF DESCRIPTION OF THE DRAWINGS

The accompanying figures, which are incorporated in and constitute a part of the specification, illustrate preferred embodiments of the invention and, together with the description, serve to explain the objects, advantages, and principles of the invention. Embodiments of the invention are in no way limited by the following figures.

DETAILED DESCRIPTION OF THE INVENTION

Figure 1:
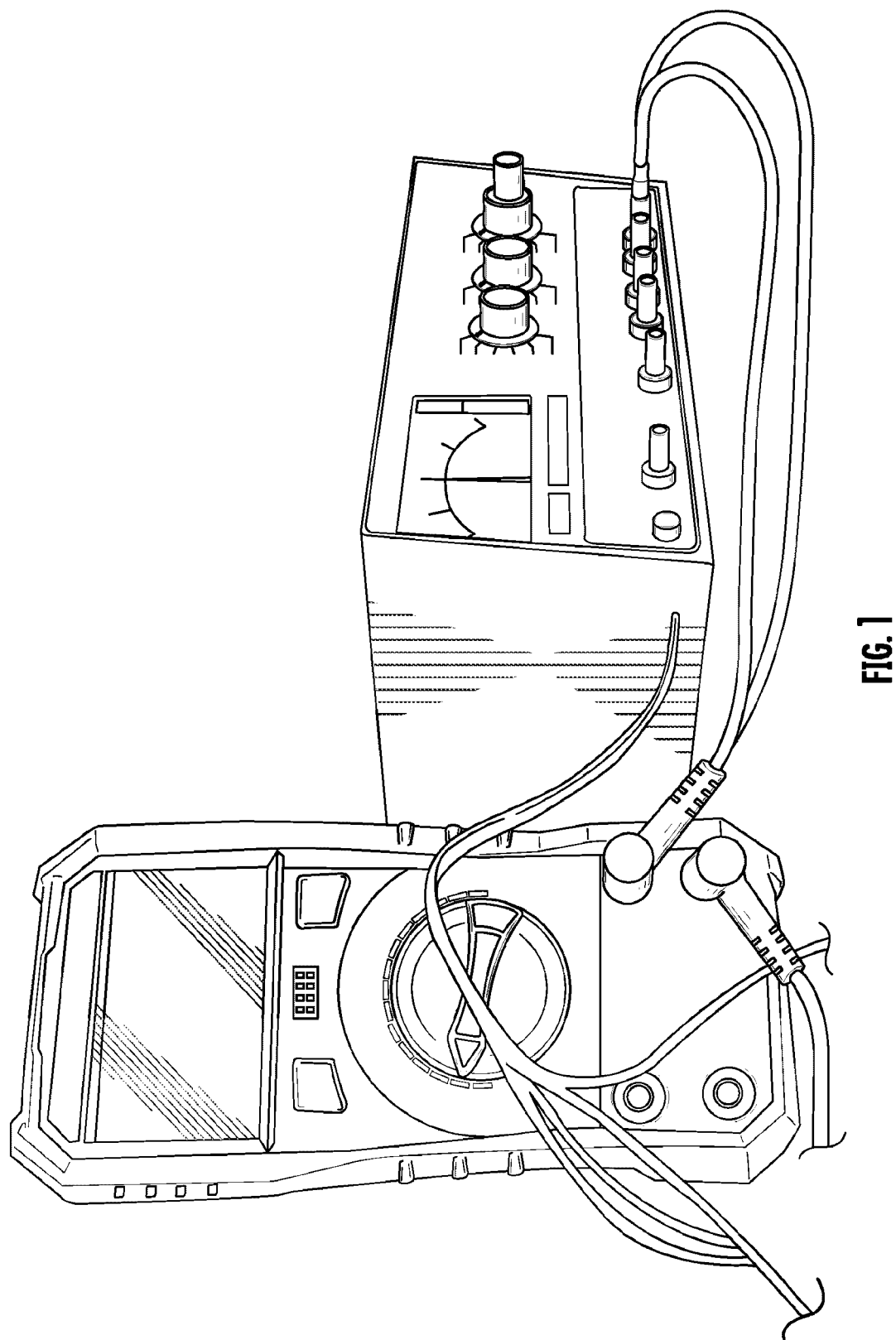
FIG. 1 shows components of an exemplary flow sensor system according to the present invention, with an indication of unoccluded fluid (e.g., formula) flow.
Figure 2:
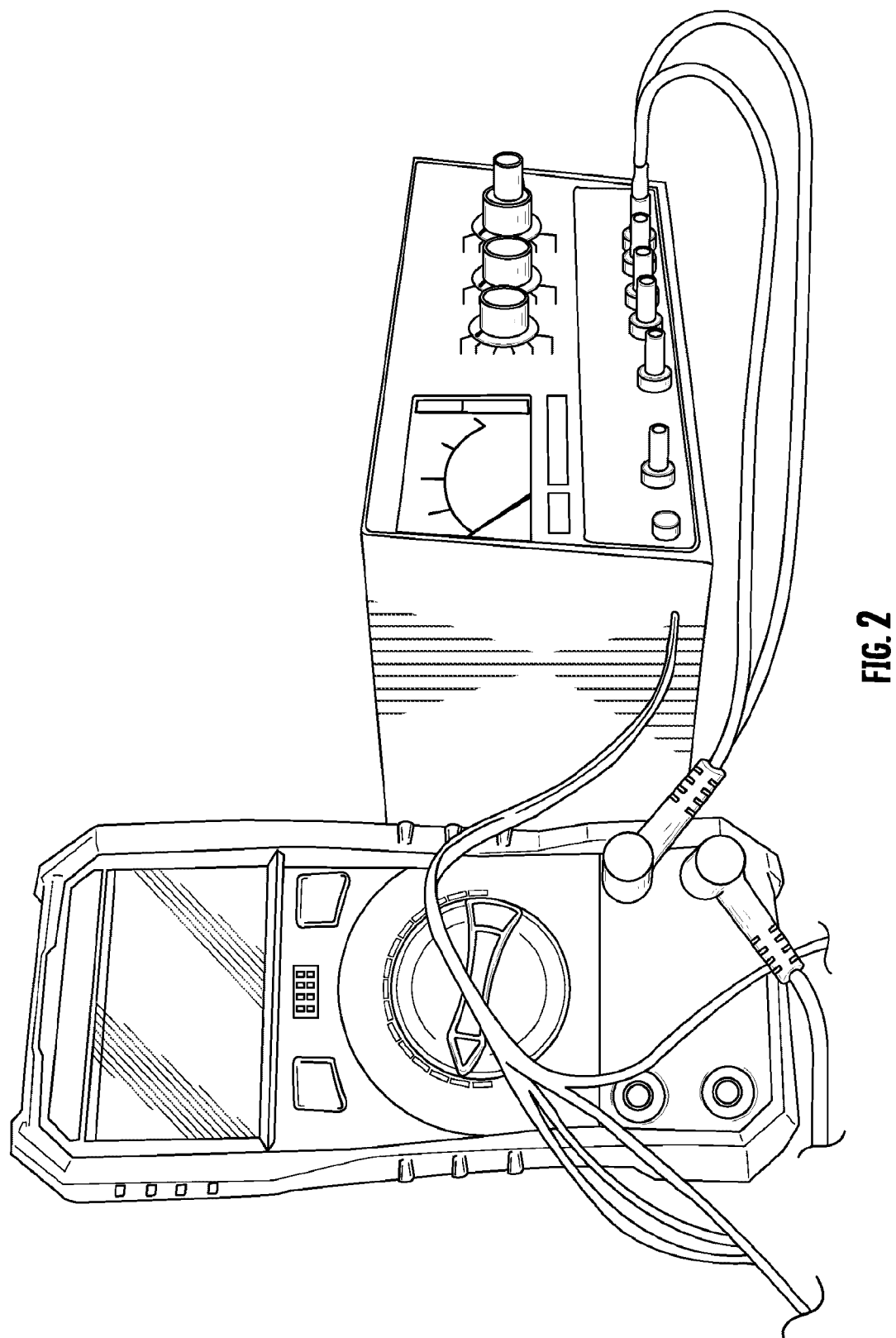
FIG. 2 shows the exemplary flow sensor system of FIG. 1, with an indication of occluded flow.

For clarity and convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

As used in this specification and the appended claims, the singular forms "a," "an" and "the" include plural referents unless the content clearly dictates otherwise.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Reference is made in detail to the presently disclosed embodiments of the invention, examples of which are illustrated in accompanying drawings, where in like reference numerals refer to like elements throughout.

Figure 4:
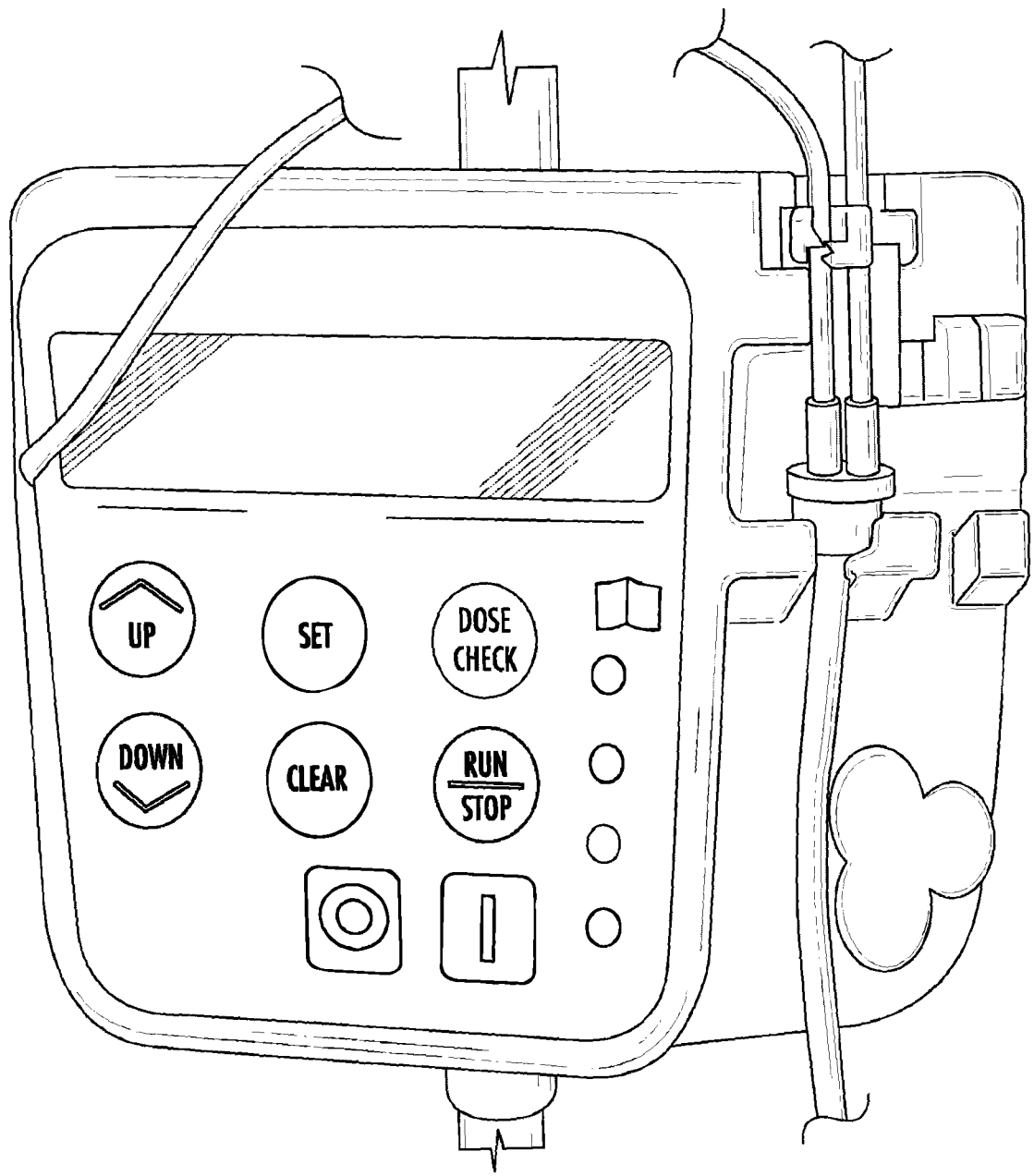
FIG. 4 shows an exemplary enteral feeding pump used with the flow sensor system of the present invention.

Embodiments of the flow sensor systems of the present invention use thermal drift to measure the presence or absence of fluid flow of the liquid nutrient formula (as opposed to the flow velocity/rate) in an enteral feeding pump (i.e., as designated by reference numeral 10 in FIG. 4). Fluid is heated at a first location and the arrival of the fluid is sensed at a second, downstream location. This approach can determine the presence or absence (i.e., an occlusion) of flow. The flow sensor system is contained within a flow detector module of the enteral feeding pump in some embodiments.

Figure 3:
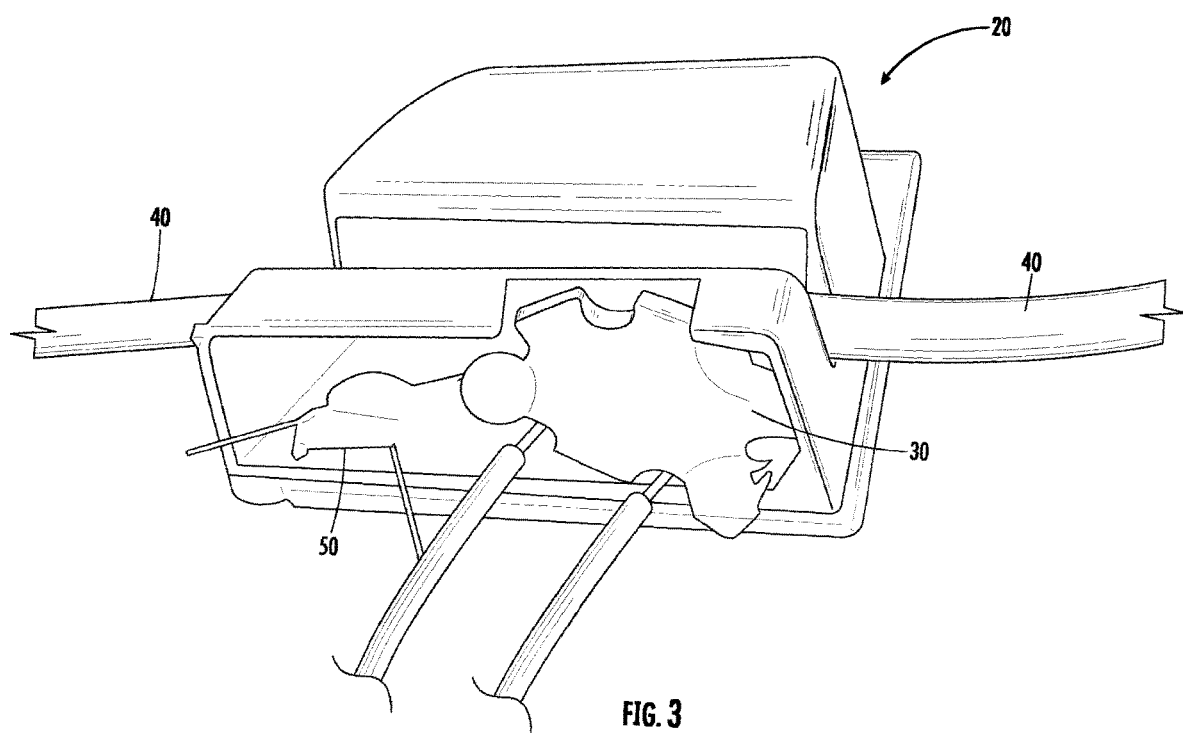
FIG. 3 shows components of the flow sensor system of FIG. 1.

Referring now to FIG. 3, in various embodiments, the flow sensor system 20 includes an IR LED 30 as a heat source at the first location on one side/end of a conduit 40 (e.g., PVC tubing or other medical-grade material tubing). In various embodiments, the flow sensor system 20 further includes a thermopile sensor 50 as the heat detector at a second location on the opposite/other side/end of the conduit 40.

Operation of the flow sensor system 20 according to an embodiment of the present invention will now be described. Liquid flow of the liquid nutrient formula is stopped, the heat source 30 at the first location (e.g., the IR LED) is activated for a programmed time interval, heating at least a portion of the liquid nutrient formula in the conduit 40. The liquid flow is then restarted. The relative temperature of the passing liquid nutrient formula is monitored by the heat sensor at the downstream location (e.g., the thermopile sensor 50). Processing the relative temperature signal reveals whether the flow of the liquid nutrient formula is low or completely absent, which indicates a partial or complete occlusion, respectively, in the conduit 40. Thus, the temperature change measured at the thermopile sensor 50 provides a meaningful signal by which to assess flow and occlusion in the conduit.

Figure 5:
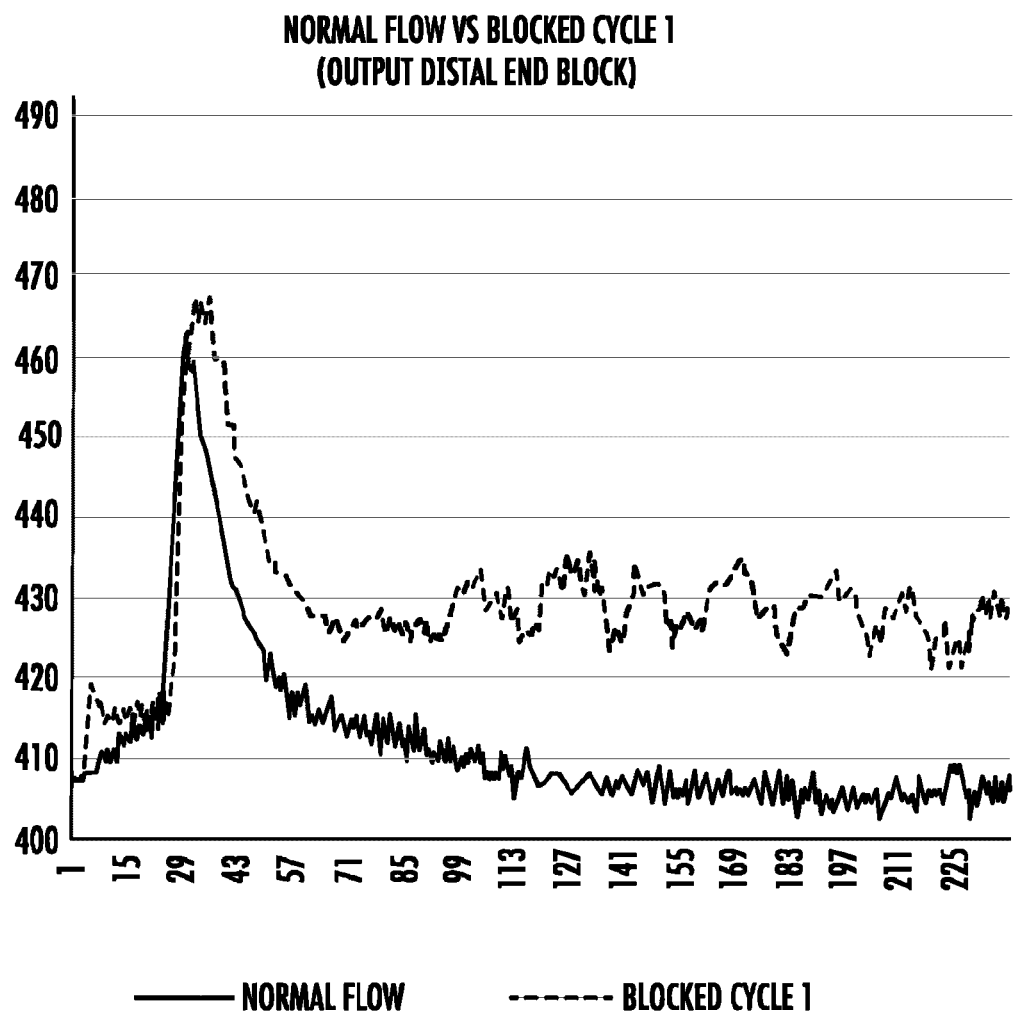
FIG. 5 is a graph of fluid temperatures in the eternal feeding pump as used with the flow sensor system of the present invention.

FIG. 5 is a graph of fluid temperatures in the eternal feeding pump as used with the flow sensor system of the present invention, where the X-axis is time (in seconds) and the Y-axis is relative temperature (dimensionless raw data, wherein the output temperature is compared to a reference temperature). The solid line shows the relative temperature of fluid passing the thermopile sensor. Temperature rises from a base level and then falls back to base level as cooler fluid displaces the elevated temperature fluid. This is the indicator of normal flow through the eternal feeding pump tubing/conduit. The dashed/broken line shows the fluid temperature rising as the heat spreads from the heat source (IR LED). After a length of time, the temperature stabilizes at a relatively higher level because the fluid is stagnant and there is no cooler fluid entering the tubing in proximity to the thermopile. This is indicative of abnormal (occluded/blocked) flow through the eternal feeding pump tubing/conduit.

Figure 6:
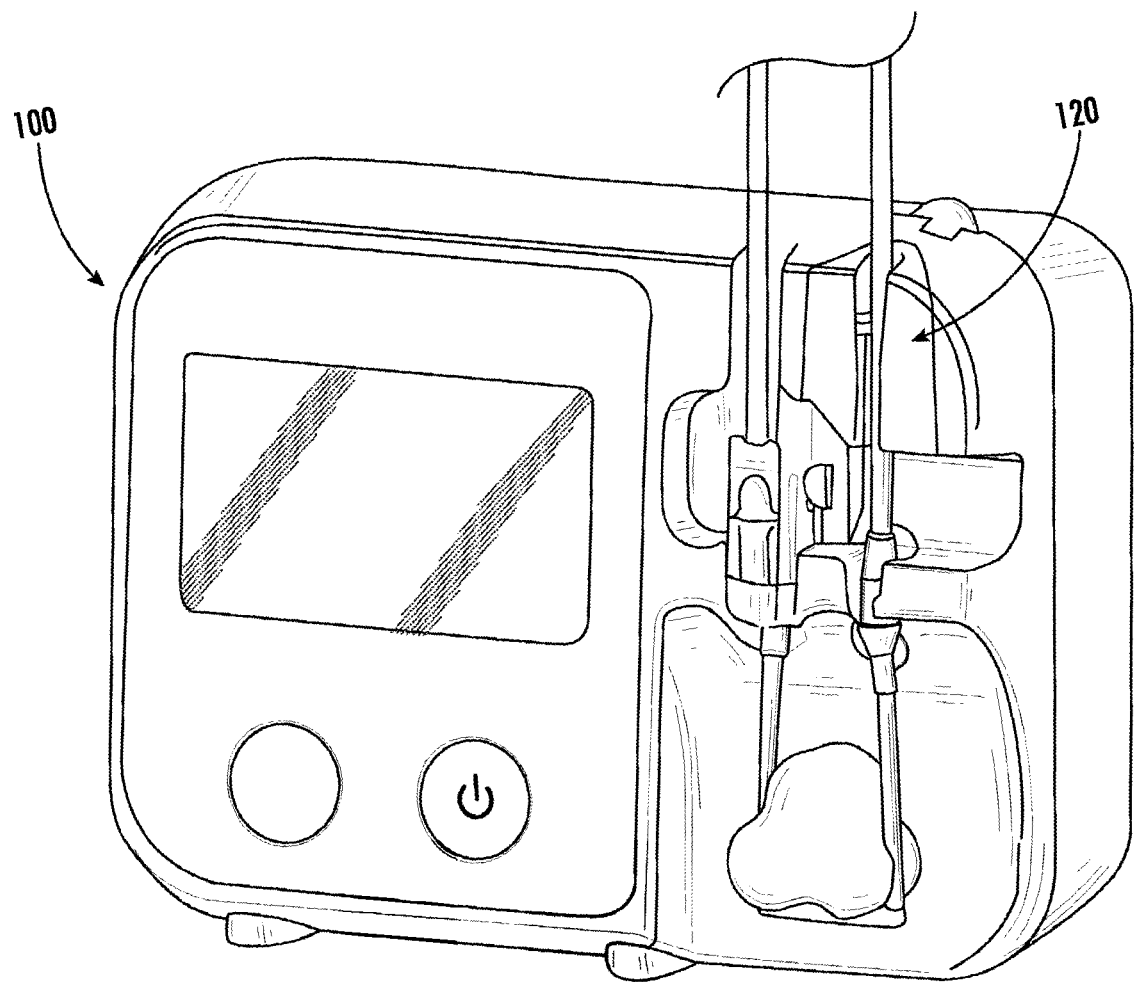
FIG. 6 is a top perspective view of an embodiment of an enteral feeding pump system with a flow sensor system according to the present invention.

Reference is now made to FIGS. 6-9, which show an embodiment of a flow sensor system 120 for use with an enteral feeding pump 100 (shown in FIG. 6). Unless otherwise indicated, the operation and components of the flow sensor system 120 are the same as, or generally similar to, the flow sensor system 20 discussed above and shown in FIGS. 1-4.

Figure 7:
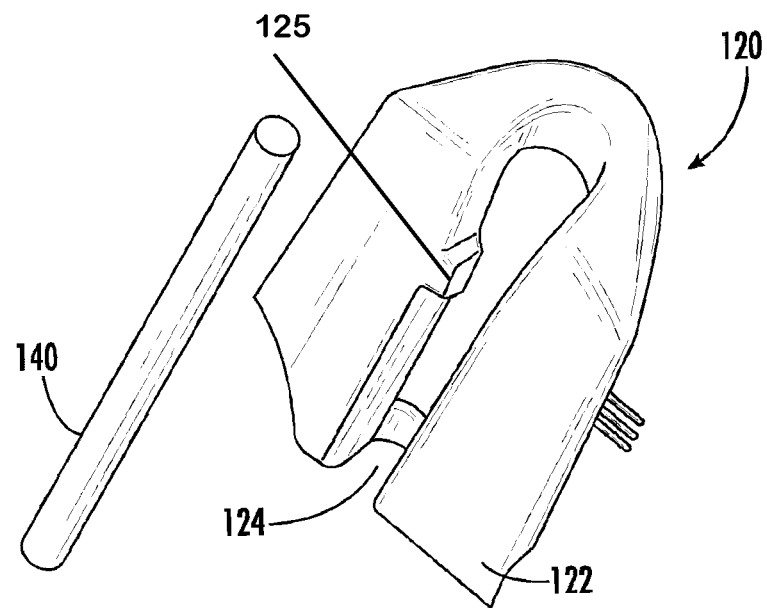
FIG. 7 is an exploded front view of the flow sensor system of FIG. 6, showing a channel to receive flexible tubing therein.
Figure 8:
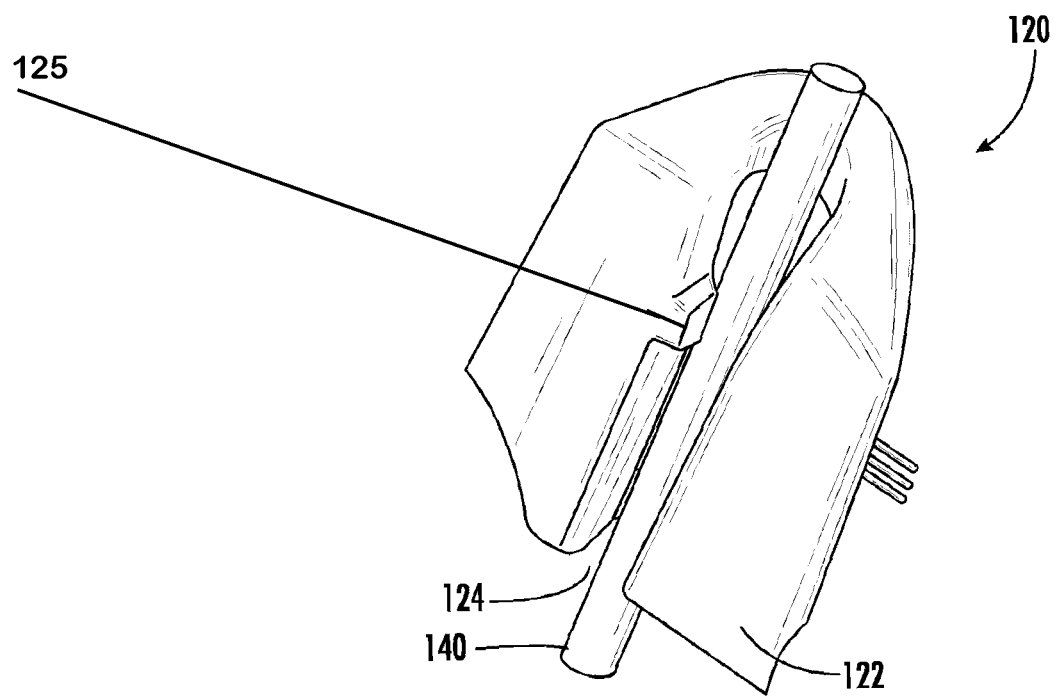
FIG. 8 is an assembled front view of the flow sensor system of FIG. 6, showing the flexible tubing inserted in the channel.

As illustrated in FIGS. 7 and 8, a substantially planar front portion 122 of the flow sensor system 120 defines a substantially U-shaped channel 124 configured to receive a conduit 140 (e.g., PVC tubing) therein. The channel 124 is dimensioned to maintain a round cross-sectional geometry of the conduit 140 without compressing the conduit 140 (i.e., squeezing opposed walls of the conduit together) within the channel 124. The front portion 122 includes a protrusion 125 adjacent the channel 124. The protrusion 125 is configured to secure the conduit 140 within the channel 124. Other configurations of the front portion and channel are also possible.

Figure 9:
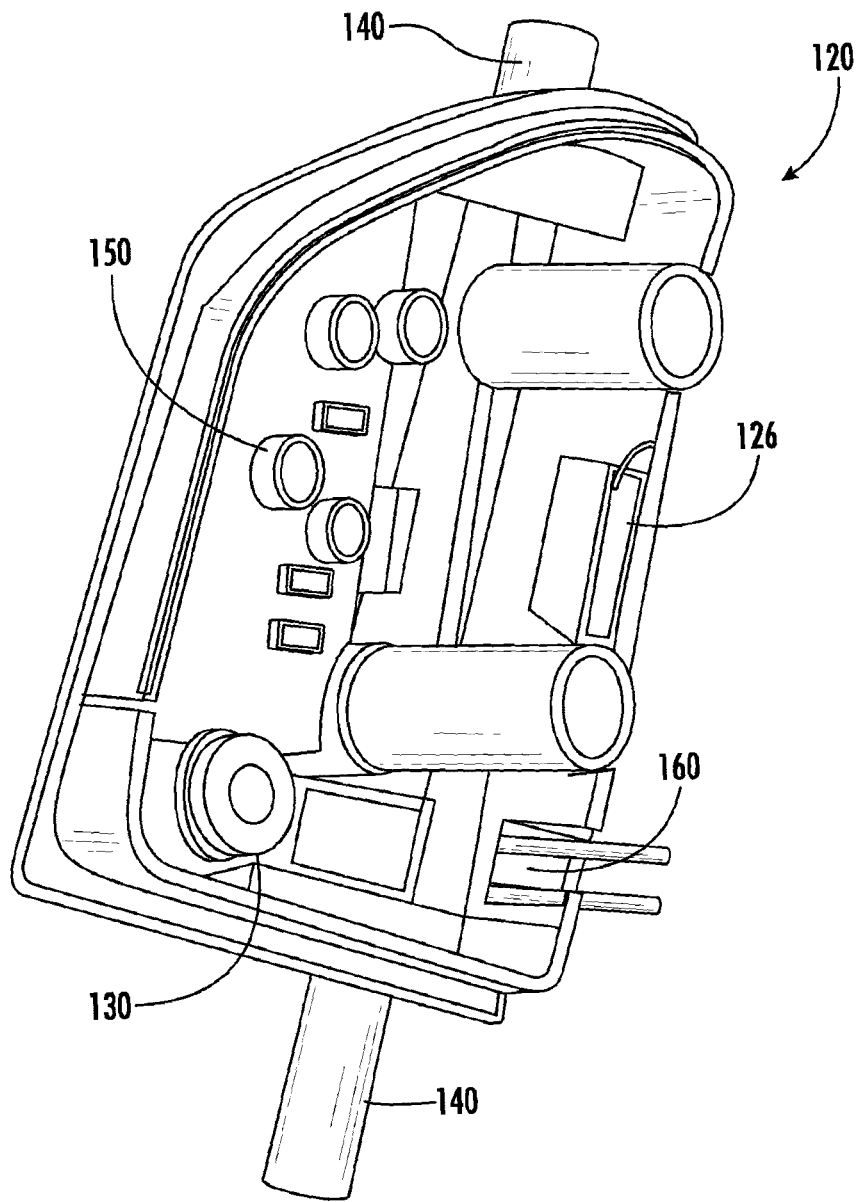
FIG. 9 is a rear view of the flow sensor system of FIG. 6, showing the various components thereof.

Referring now to FIG. 9, in various embodiments, the flow sensor system 120 includes a rear portion 126 that incorporates an IR LED 130 (e.g., an IR high-power LED) as a heat source at the first location on one side/end of the conduit 140. In various embodiments, the flow sensor system 120 further includes a thermopile sensor 150 as the heat detector at a second location on the opposite/other side/end of the conduit 140. In various embodiments, the flow sensor system 120 further includes a photodiode IR sensor 160 at a location proximate the IR LED 130 that is configured to be illuminated by the IR LED 130. The photodiode IR sensor 160 is used to detect the presence of the conduit 140 (tubing) in the channel 124. This information is used to prevent false alarms if the conduit 140 is not in proper position (i.e., within the channel 124).

Reference is now made to FIGS. 10-16, which constitute a series of block diagrams of an enteral feeding pump 200 and embodiments of a flow sensor system 220 (also referred to as the thermal drift flow sensor) for use with the enteral feeding pump. Unless otherwise indicated, the operation and components of the flow sensor system 220 are the same as, or generally similar to, the flow sensor systems 20 and 120 discussed above and shown in FIGS. 1-4 and 6-9.

Figure 10:
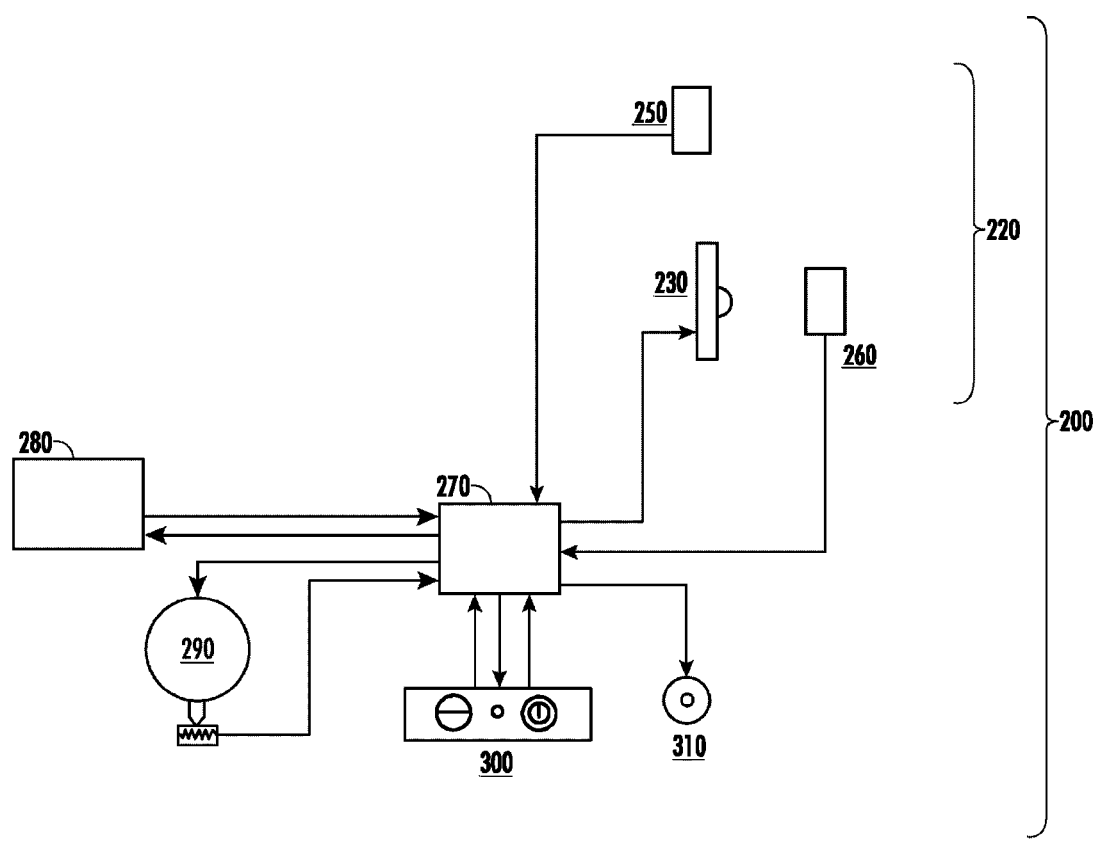
FIG. 10 is a block diagram of an embodiment of an enteral feeding pump with a flow sensor system and control according to the present invention.

The block diagram of FIG. 10 shows the enteral feeding pump 200 including the flow sensor system 220, which has a dual mode IR LED 230, a thermopile heat sensor 250 and a photodiode IR sensor 260. The IR LED 230, thermopile heat sensor 250 and photodiode IR sensor 260 all operatively engage a controller (with memory) 270 of the enteral feeding pump 200. In various embodiments, the controller 270 also operably engage other components of the enteral feeding pump 200, including a touchscreen display 280, a pump motor 290, a keypad 300 having an AC/battery LED, and a piezo alarm 310.

Figure 11:
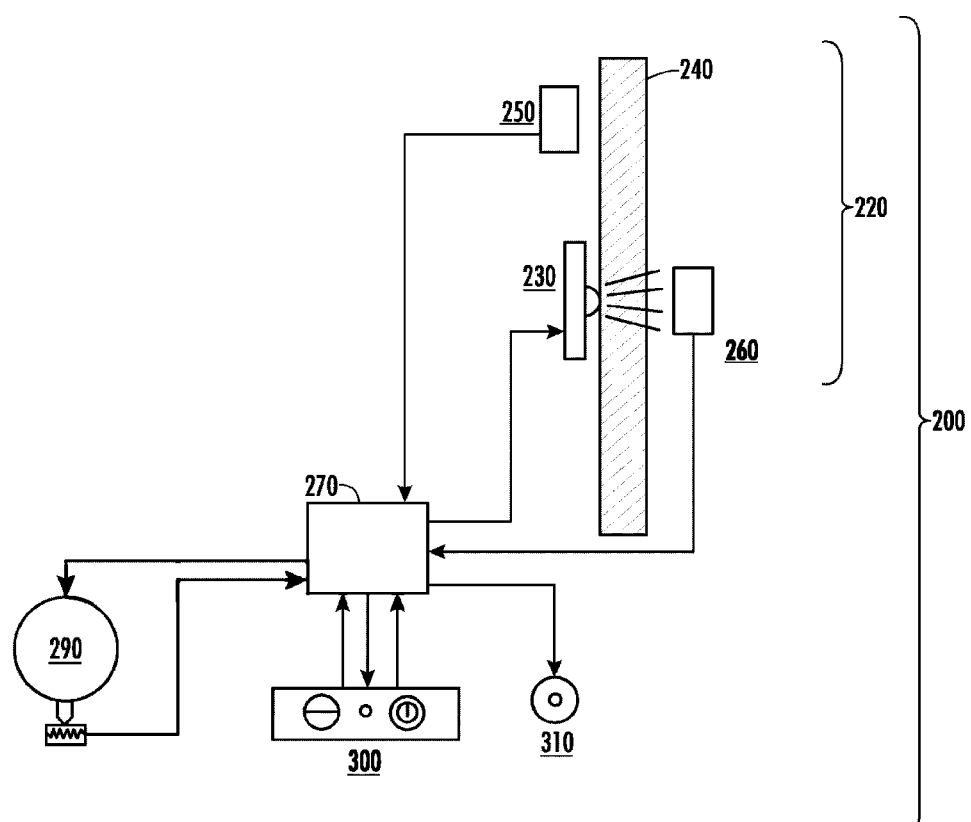
FIG. 11 is a block diagram of an embodiment of an enteral feeding pump according to the present invention, including a schematic representation of empty tubing being detected by photodiode illuminated by IR LED operated at low power.

The block diagram of FIG. 11 includes a schematic representation of enteral feeding pump 200 having empty tubing (i.e., a conduit) 240 being detected by the photodiode IR sensor 260 being illuminated by the IR LED 230, as operated at low power. The photodiode IR sensor 260 is used to detect the presence of the tubing/conduit 240, i.e., in a channel (not shown). This information is used to prevent false alarms if the conduit 240 is not in proper position.

Figure 12:
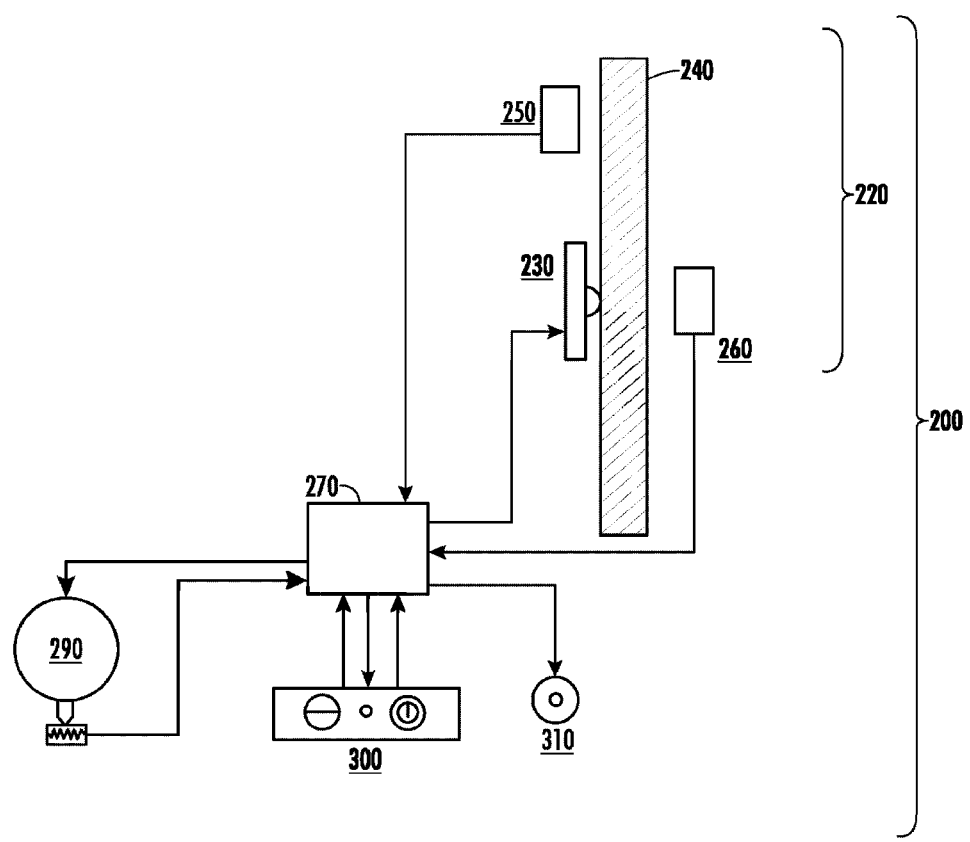
FIG. 12 is a block diagram of an embodiment of an enteral feeding pump according to the present invention, including a schematic representation of fluid-filled tubing attenuating photodiode illumination that allows decision and control of flow functions.

The block diagram of FIG. 12 includes a schematic representation of the enteral feeding pump 200 having the tubing 240 filled with fluid and attenuating photodiode illumination (i.e., from the IR LED 230) that facilitates the decision and control of flow functions of the enteral feeding pump 200 by illuminating the photodiode IR sensor 260 to show the status of the tubing/conduit 240.

Figure 13:
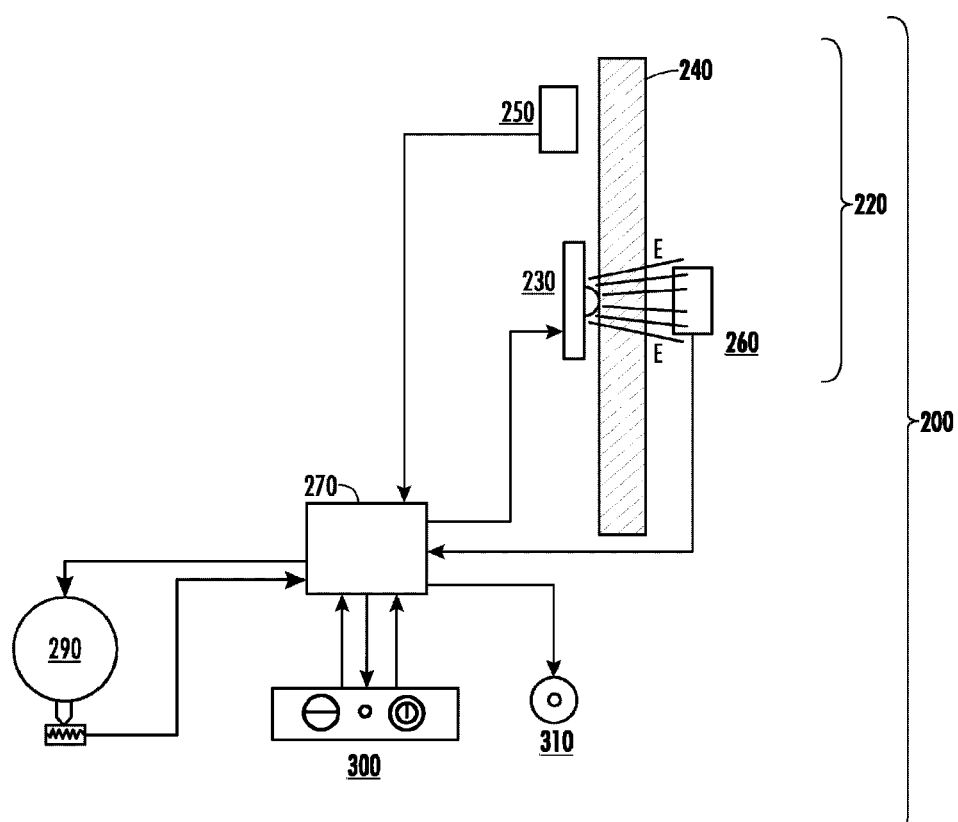
FIG. 13 is a block diagram of an embodiment of an enteral feeding pump according to the present invention, including a schematic representation of fluid-filled tubing in no-flow status, with IR high power LED radiating sufficient energy to raise the fluid temperature.

The block diagram of FIG. 13 includes a schematic representation of the enteral feeding pump 200 having the tubing 240 filled with fluid and in a no-flow status, with the IR LED 230 radiating sufficient energy E to raise the fluid temperature of the fluid in the tubing 240. For the purposes of this disclosure, "sufficient energy" is defined as the minimum amount of energy needed to resolve an unambiguous signal. This is a function of the resolution of the electronics and the thermopile heat sensor 250. Too much energy may result in overheating of the system.

Figure 14:
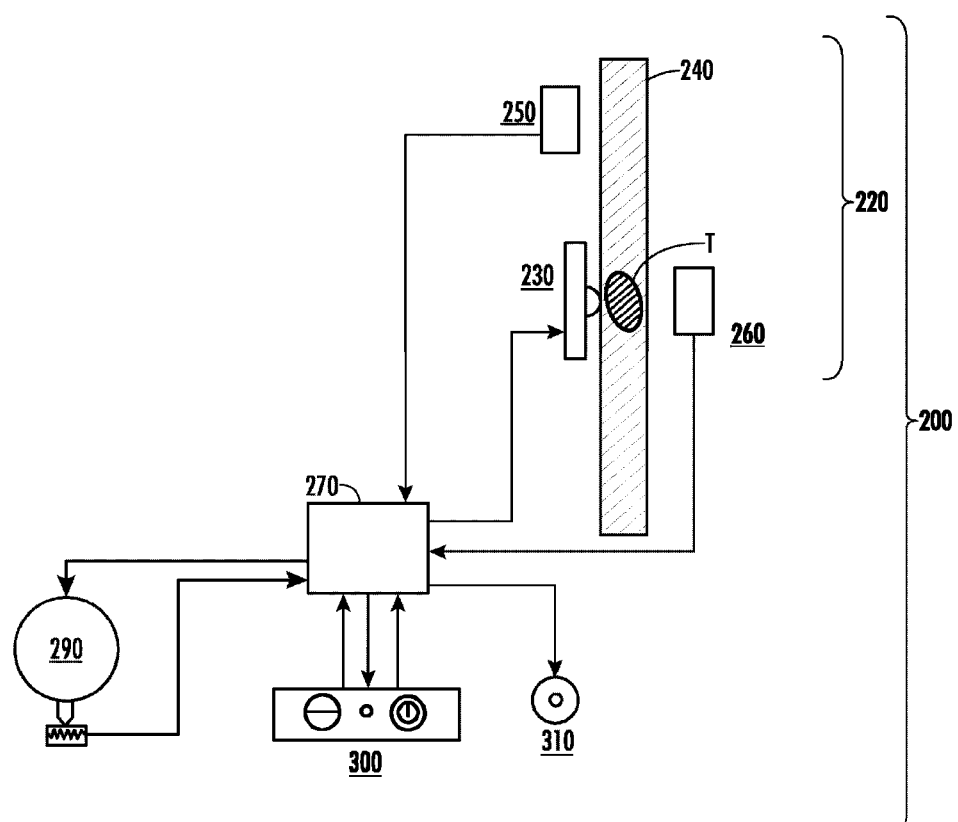
FIG. 14 is a block diagram of an embodiment of an enteral feeding pump system according to the present invention, including a schematic representation of fluid-filled tubing in no-flow status, with the fluid temperature having been elevated by IR LED.
Figure 15:
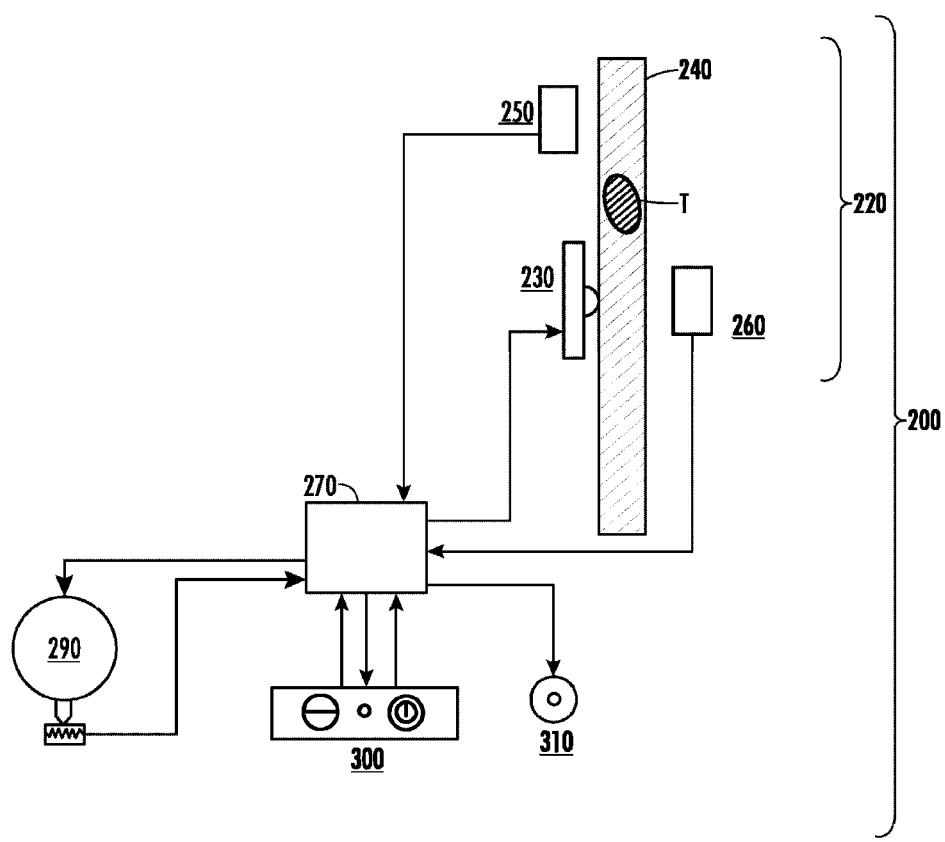
FIG. 15 is a block diagram of an embodiment of an enteral feeding pump system according to the present invention, including a schematic representation of fluid-filled tubing with flowing fluid, and the elevated temperature area moving downstream.

The block diagram of FIG. 14 includes a schematic representation of the enteral feeding pump 200 having the tubing 240 filled with fluid and in no-flow status, with a portion of the fluid T having had its fluid temperature elevated by the IR LED 230. In one embodiment, the temperature is elevated by about 3.5° C. The block diagram of FIG. 15 includes a schematic representation of the enteral feeding pump 200 having the tubing 240 filled with flowing fluid, wherein the fluid portion T with the elevated fluid temperature moves downstream with the fluid flow.

Figure 16:
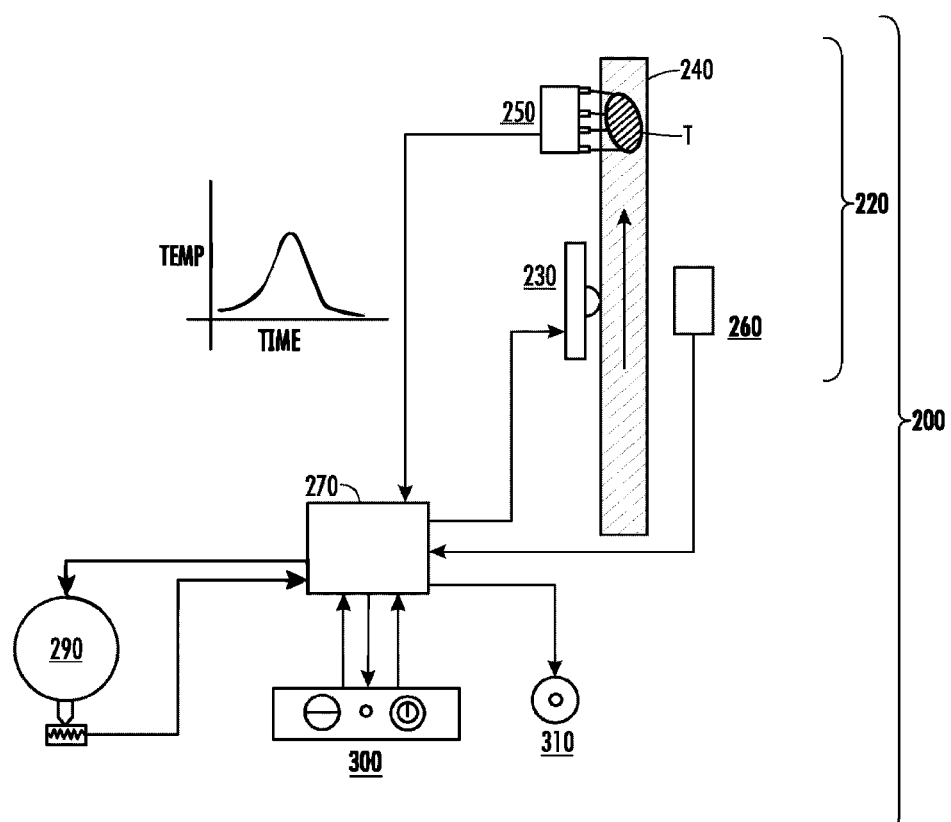
FIG. 16 is a block diagram of an embodiment of an enteral feeding pump system according to the present invention, including a schematic representation of fluid-filled tubing with flowing fluid, and the elevated temperature area passing a thermopile causes a voltage output versus time that is compared to various responses stored in a controller memory, where the comparison allows a determination of the presence of absence of fluid flow.

FIG. 16 is a block diagram that includes a schematic representation of the enteral feeding pump 200 having the tubing 240 filled with flowing fluid with the fluid portion T with the elevated fluid temperature passing the thermopile 250. Such passage causes a voltage output versus time, as shown in the inset graph of FIG. 16.

Figure 17:
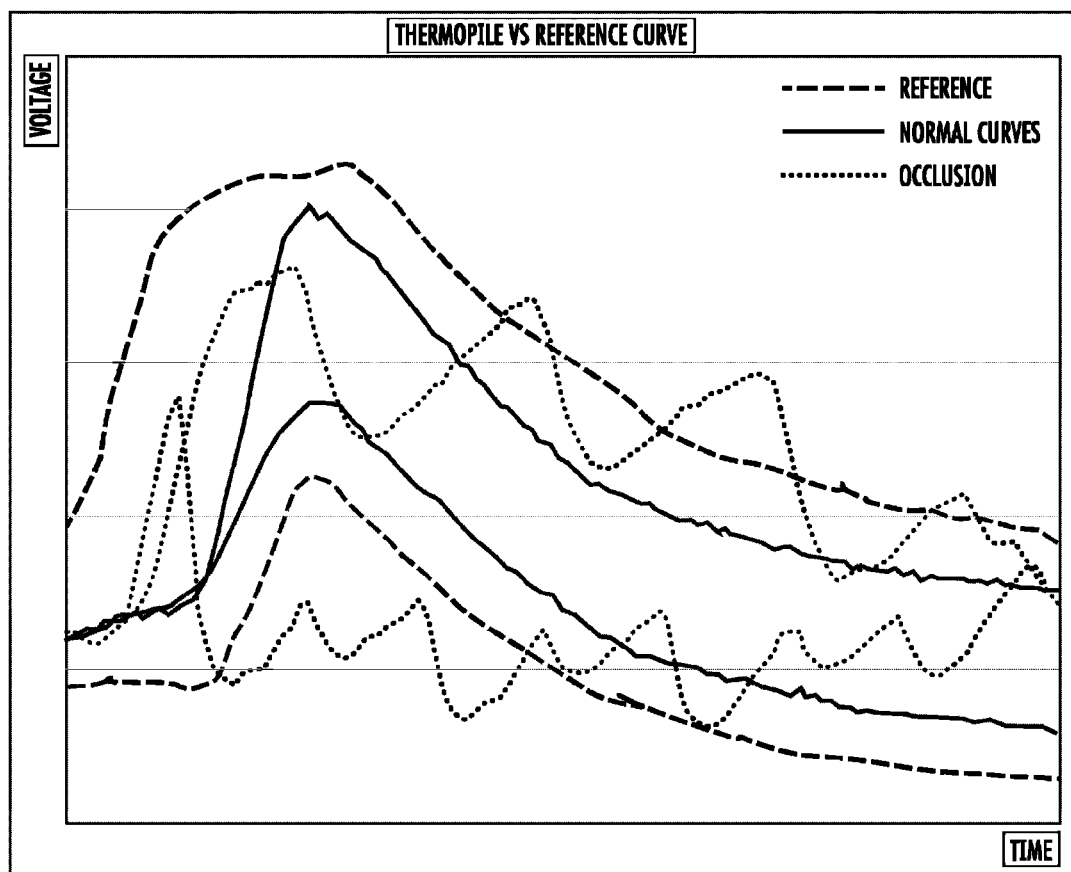
FIG. 17 is a graph showing varying voltage examples of occlusion and normal flow compared with reference limits stored in the controller memory in an embodiment of an enteral feeding pump system according to the present invention.

FIG. 17 is a graph of voltage output versus time for response curves for high and low normal flows (solid lines), high and low occluded flows (dotted lines), and high and low reference flows (dashed lines) as stored in the controller memory 270. The comparison between curves allows a user to determine the presence or absence of fluid flow. The time may range from 10 seconds to 240 seconds. Values that cross over the high or low dashed curves of the reference flow values represent flows that are occluded (i.e., the dotted line curves).

In another embodiment of the invention, a method of detecting the presence or absence of flow of the liquid nutrient formula through the conduit of the enteral feeding system includes the following steps: (1) providing a flow sensor system for detecting the presence or absence of flow through the conduit, including a heat source disposed at a first location at a first portion of the conduit and a heat detector disposed at a second location at a second portion of the conduit; (2) activating the heat source; determining a reference temperature $T_1$ of the liquid nutrient formula at the second location; measuring a second temperature $T_2$ of the liquid nutrient formula at the second location; (3) calculating the difference between the reference and second temperatures; and (4) determining from the difference between the reference and second temperatures whether the flow of the liquid nutrient formula is low or completely absent, which would indicate a partial or complete occlusion, respectively, in the conduit.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Other embodiments of the invention will be apparent to those skilled in the art from consideration of the specification and practice of the invention disclosed herein. Although specific advantages have been enumerated above, various embodiments may include some, none, or all of the enumerated advantages. It is intended that the embodiments described above be considered as exemplary only, with a true scope and spirit of the invention being indicated by the appended claims. Moreover, none of the features disclosed in this specification should be construed as essential elements, and therefore, no disclosed features should be construed as being part of the claimed invention unless the features are specifically recited in the claims. In addition, it should be understood that any of the features disclosed on any particular embodiment may be incorporated in whole or in part on any of the other disclosed embodiments.

In any interpretation of the claims appended hereto, it is noted that no claims or claim elements are intended to invoke or be interpreted under 35 U.S.C. 112(f) unless the words "means for" or "step for" are explicitly used in the particular claim.

In general, any combination of disclosed features, components and methods described herein is possible. Steps of a method can be performed in any order that is physically possible.

All cited references are incorporated by reference herein.

Although embodiments have been disclosed, it is not desired to be limited thereby. Rather, the scope should be determined only by the appended claims.

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

In general, any combination of disclosed features, components and methods described herein is possible. Steps of a method can be performed in any order that is physically possible.

The invention claimed is:

1. A flow sensor system for detecting the presence or absence of flow through a conduit of an enteral feeding system, comprising:
   a substantially planar front portion;
   a substantially U-shaped channel formed in the front portion and configured to retain the conduit therein, the channel dimensioned to maintain a round cross-sectional geometry of the conduit without compressing the conduit within the channel;
   a heat source disposed at a first location at a first portion of the conduit;
   a heat detector disposed at a second location at a first portion of the conduit; and
   a controller configured to perform the following steps:
      determining a reference temperature T1 of a liquid nutrient formula at the second location;
      activating the heat source;
      measuring a second temperature T2 of the liquid nutrient formula at the second location;
      calculating the difference between the reference and second temperatures; and
      determining from the difference between the reference and second temperatures whether a partial or complete occlusion is present in the conduit.

2. The flow sensor system of claim 1, wherein the heat source includes an IR LED.

3. The flow sensor system of claim 2, further comprising a photodiode IR sensor at a location proximate the IR LED, wherein the photodiode IR sensor is configured to be illuminated by the IR LED, and whereby the photodiode IR sensor is used to detect the presence of the conduit in the channel.

4. The flow sensor system of claim 2, wherein the IR LED is configured to elevate the temperature of a portion of a fluid in the conduit.

5. The flow sensor system of claim 4, wherein the temperature is elevated by about 3.5° C.

6. The flow sensor system of claim 4, wherein the fluid portion with the elevated fluid temperature moves downstream through the conduit with fluid flow therethrough.

7. The flow sensor system of claim 6, wherein the fluid portion with the elevated fluid temperature passes the heat detector, and such passage causes a voltage output versus time.

8. The flow sensor system of claim 7, wherein the time ranges from 10 seconds to 240 seconds.

9. The flow sensor system of claim 7, further comprising a controller memory, wherein the voltage output versus time is compared to response curves stored in the controller memory, whereby the comparison allows a user to determine the presence or absence of fluid flow in the conduit.

10. The flow sensor system of claim 9, wherein the response curves stored in the controller memory include those for reference flows.

11. The flow sensor system of claim 1, wherein the heat detector includes a thermopile sensor.

12. The flow sensor system of claim 1, wherein the front portion includes a protrusion adjacent the channel, the protrusion being configured to secure the conduit within the channel.

13. A flow sensor system for detecting the presence or absence of flow through a conduit of an enteral feeding system, comprising:
   a substantially planar front portion;
   a substantially U-shaped channel formed in the front portion and configured to retain the conduit therein, the channel dimensioned to maintain a round cross-sectional geometry of the conduit without compressing the conduit within the channel;
   a heat source disposed at a first location at a first portion of the conduit, the heat source including an IR LED;
   a photodiode IR sensor, at a location proximate the IR LED, wherein the photodiode IR sensor is configured to be illuminated by the IR LED, and whereby the photodiode IR sensor is used to detect the presence of the conduit in the channel;
   a heat detector disposed at a second location at a second portion of the conduit, the heat detector including a thermopile sensor; and
   a controller configured to perform the following steps:
      determining a reference temperature T1 of a liquid nutrient formula at the second location;
      activating the heat source;
      measuring a second temperature T2 of the liquid nutrient formula at the second location;
      calculating the difference between the reference and second temperatures; and
      determining from the difference between the reference and second temperatures whether a partial or complete occlusion is present in the conduit.

14. The flow sensor system of claim 13, wherein the IR LED is configured to elevate the temperature of a portion of a fluid in the conduit.

15. The flow sensor system of claim 14, wherein the temperature is elevated by about 3.5° C.

16. The flow sensor system of claim 14, wherein the fluid portion with the elevated fluid temperature moves downstream through the conduit with fluid flow therethrough.

17. The flow sensor system of claim 16, wherein the fluid portion with the elevated fluid temperature passes the heat detector, and such passage causes a voltage output versus time.

18. The flow sensor system of claim 17, wherein the time ranges from 10 seconds to 240 seconds.

19. The flow sensor system of claim 17, further comprising a controller memory, wherein the voltage output versus time is compared to response curves stored in the controller memory, whereby the comparison allows a user to determine the presence or absence of fluid flow in the conduit.

20. The flow sensor system of claim 19, wherein the response curves stored in the controller memory include those for reference flows.

21. The flow sensor system of claim 13, wherein the front portion includes a protrusion adjacent the channel, the protrusion being configured to secure the conduit within the channel.

22. A method of detecting the presence or absence of flow of a liquid nutrient formula through a conduit of an enteral feeding system, comprising the steps of:
   providing a flow sensor system for detecting the presence or absence of flow through the conduit, the flow sensor system including
      a substantially planar front portion,
      a substantially U-shaped channel formed in the front portion and configured to retain the conduit therein, the channel dimensioned to maintain a round cross-sectional geometry of the conduit without compressing the conduit within the channel,
      a heat source disposed at a first location at a first portion of the conduit and
      a heat detector disposed at a second location at a second portion of the conduit;
   determining a reference temperature $T_1$ of the liquid nutrient formula at the second location;
   activating the heat source;
   measuring a second temperature $T_2$ of the liquid nutrient formula at the second location;
   calculating the difference between the reference and second temperatures; and
   determining from the difference between the reference and second temperatures whether a partial or complete occlusion is present in the conduit.

\* \* \* \* \*